Nov. 12, 1946.   C. E. NORDSTROM   2,410,896
METAL CUTTING TOOL
Filed Jan. 29, 1945

INVENTOR
CARL E. NORDSTROM
BY *Emery Robinson*
ATTORNEY

Patented Nov. 12, 1946

2,410,896

UNITED STATES PATENT OFFICE 2,410,896

METAL CUTTING TOOL

Carl E. Nordstrom, Evanston, Ill., assignor to Teletype Corporation, Chicago, Ill., a corporation of Delaware Application January 29, 1945, Serial No. 575,137

1 Claim. (Cl. 77—73.5)

This invention relates to metal cutting tools and more particularly to burring or counterboring and countersinking devices.

The principal object of the invention is to provide a metal cutting device for simplifying the execution of certain metal cutting operations.

Another object of the invention is to provide a burring tool which comprises a retractable cutting element which is susceptible of being ejected by camming action automatically upon forcing the tool into cutting position.

Specifically, the burring tool comprising a shank, cutting element, compression spring and collar is clamped in a drill chuck or similar holding device in a lathe or drill press. The piece part to be burred is held in a suitable fixture and as the burring tool is piloted through the hole, the edge of which is to be burred, the cutting element is held in retracted position by a spring, compressed between the cutting element and the shank portion. Then, as pressure is applied to force the cutting element into the hole to be burred, the cutting element, due to the camming action between the edge of the hole and a rounded corner of the cutting element, will be cammed forward to countersink or counterbore the hole in the piece part. With the device, according to the present invention, countersinking or burring operations which were heretofore inaccessible and difficult of execution are rendered more readily accessible.

The foregoing objects and features of the invention will appear from the following detailed description taken in conjunction with the accompanying drawing, in which Fig. 1 is an elevational view of the arrangement according to the present invention;

Figure 2:
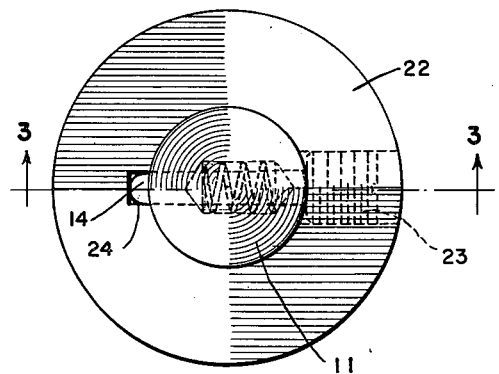
Fig. 2 is a top view of the device substantially as shown in Fig. 1.

Having reference to the drawing, a spindle or shank 11 is adapted to be clamped in a drill chuck (not shown) or similar holding device in a lathe or drill press. A U-formed piece part 12 to be burred is held in a suitable fixture (not shown), appropriately placed on the table of the drill press. The shank 11 is recessed or slotted at 13 to receive, slidably therein, a cutting element or blade 14. Blade 14 is provided with a forwardly extending portion 15 which terminates in a cutting edge 16, which portion extends through an aperture 17 in shank 11 which connects with the recess 13. Of course, the projection 15 may be round or square or of any geometrical conformation. Furthermore, the cutting edge may be conformed or shaped to produce a countersink, or it may be shaped to produce a counterbore, if desired.

Figure 3:
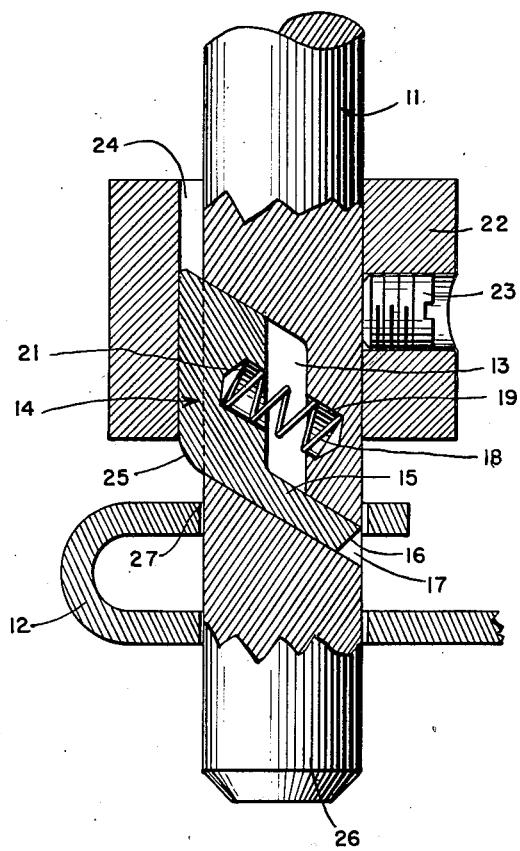
Fig. 3 is a vertical sectional view taken approximately on line 3—3 of Fig. 2.

A compression spring 18 is positioned in the recess 13 and is seated in spring seats 19 and 21 in the shank 11 and element 14, respectively. In this manner, the spring 18 normally tends to eject the element 14 and to maintain said element 14 in its protruded position, as shown in Fig. 3. A collar 22 is adjustably mounted on shank 11 by means of a set screw 23. Collar 22 is provided with a groove 24 joining its central opening to receive the element 14. Collar 22 thus restricts or limits the movement of blade 14. The edge of element 14 is appropriately curved at 25 to provide a camming surface.

Figure 1:
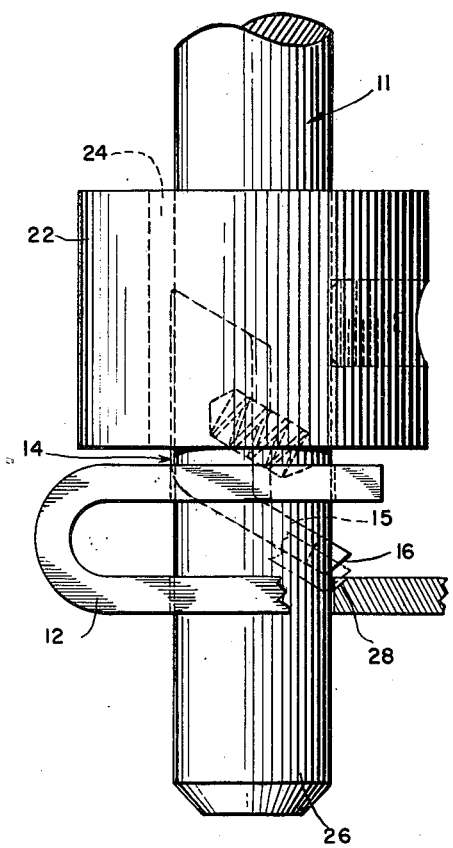

In the operation of the arrangement according to the invention, the pilot 26, forming the lower end of the shank 11, is caused to be projected through the hole to be burred. Then, as pressure is applied to shank 11 to force the blade 14 further into the piece part 12, the blade 14, due to the camming action between shoulder 27 of the piece part 12 and curved portion 25 of blade 14, will be cammed forward to the dotted position shown in Fig. 1, to countersink and "burr" the piece part 12 at 28. It is observed that the collar 22 is independently adjustable along the shank 11 and not only restricts or limits the movement of blade 12, but also, it gauges the depth of countersinking as determined by its position on the shank 11. By advancing or adjusting the collar 22 toward the end of the pilot 26, the aperture in the piece part 12 is countersunk to a lesser degree than if the collar 22 were shifted or adjusted in the opposite direction. The device according to the invention facilitates the burring of the inner sides of U-formed piece parts.

The embodiment described herein is considered to be illustrative and not restrictive, and accordingly, all modifications are contemplated which come within the spirit and scope of the appended claim.

What is claimed is:

In a burring tool, a rotatable cutter-carrying member comprising a shank adapted to be inserted through a hole in the work, a retractable cutter reciprocably mounted in a slot in said shank, said cutter provided with a cam contour, a collar adjustably carried on said shank and grooved to receive said cutter in retracted position, and spring means for yieldably retaining said cutter in said groove between said shank and said collar, said spring means thereby normally acting to retract said cutter and urge it against said collar, whereby upon the cooperation of said cam contour with said work when the tool is forced into cutting position said cutter is automatically ejected by the camming action between said cam contour and said work.

CARL E. NORDSTROM.